US009336110B2

(12) United States Patent
Fowles et al.

(10) Patent No.: US 9,336,110 B2
(45) Date of Patent: May 10, 2016

(54) IDENTIFYING PERFORMANCE LIMITING INTERNODE DATA SHARING ON NUMA PLATFORMS

(71) Applicant: Red Hat Inc., Raleigh, NC (US)

(72) Inventors: Richard G. Fowles, Meadow Vista, CA (US); Joseph P. Mario, Westford, MA (US); Donald C. Zickus, II, Marlborough, MA (US)

(73) Assignee: Red Hat, Inc., Raleigh, NC (US)

( * ) Notice: Subject to any disclaimer, the term of this patent is extended or adjusted under 35 U.S.C. 154(b) by 157 days.

(21) Appl. No.: 14/167,760

(22) Filed: Jan. 29, 2014

(65) Prior Publication Data

US 2015/0212940 A1 Jul. 30, 2015

(51) Int. Cl.
*G06F 11/34* (2006.01)
*G06F 11/30* (2006.01)

(52) U.S. Cl.
CPC ............ *G06F 11/30* (2013.01); *G06F 11/3466* (2013.01); *G06F 2201/86* (2013.01); *G06F 2201/885* (2013.01)

(58) Field of Classification Search
None
See application file for complete search history.

(56) References Cited

U.S. PATENT DOCUMENTS

| | | | |
|---|---|---|---|
| 6,073,216 A | 6/2000 | McDonald et al. | |
| 6,611,926 B1 | 8/2003 | Gaither et al. | |
| 6,785,779 B2 | 8/2004 | Berg et al. | |
| 7,434,002 B1 | 10/2008 | Zedlewski et al. | |
| 7,502,888 B2 | 3/2009 | Fowles | |
| 7,613,885 B2 | 11/2009 | Uehara et al. | |
| 8,751,748 B2 * | 6/2014 | Ahn | G06F 12/08 711/130 |
| 2002/0049824 A1 * | 4/2002 | Wilson | G06F 12/0813 709/213 |
| 2005/0155021 A1 * | 7/2005 | DeWitt, Jr. | G06F 9/30181 717/130 |
| 2006/0112228 A1 * | 5/2006 | Shen | G60F 12/084 711/133 |
| 2007/0186044 A1 * | 8/2007 | Fowles | G06F 9/52 711/130 |
| 2008/0301700 A1 * | 12/2008 | Junkins | G06F 9/542 718/108 |
| 2009/0144506 A1 * | 6/2009 | Barth, Jr. | G06F 12/0893 711/129 |
| 2009/0172360 A1 * | 7/2009 | Hikichi | G06F 9/3824 712/216 |
| 2010/0138811 A1 * | 6/2010 | Jayaraman | G06F 11/3466 717/125 |
| 2012/0117323 A1 * | 5/2012 | Cypher | G06F 12/0855 711/118 |
| 2014/0156939 A1 * | 6/2014 | Chung | G06F 11/3624 711/130 |

OTHER PUBLICATIONS

Kaxiras, S. et al., Coherence Communication Prediction in Shared-Memory Multiprocessors, Lucent Technology, Bell Labs, USA, 2000, 12 pages.

Tam, David et al., Thread Clustering: Sharing-Aware Scheduling on SMP-CMP-SMT Multiprocessors, Department of Electrical and Computer Engineering, University of Toronto, Mar. 21-23, 2007, 12 pages.

Pesterev, Aleksey, Locating Cache Performance Bottlenecks Using Data Profiling, Massachusetts Institute of Technology, Feb. 23, 2010, 14 pages.

(Continued)

*Primary Examiner* — Kris Rhu
(74) *Attorney, Agent, or Firm* — Haynes and Boone, LLP (57) ABSTRACT

Methods, systems, and computer program products for identifying performance limiting internode data sharing on Non-Uniform Memory Access (NUMA) platforms are provided. A computer-implemented method may include receiving event records collected by a performance monitoring unit (PMU) during event tracing, associating the event records with corresponding operating system information observed during the event tracing, analyzing the event records to identify shared cache line utilization, and generating a shared cache line utilization report in view of the analyzing.

20 Claims, 6 Drawing Sheets

(56) References Cited

OTHER PUBLICATIONS

Wicaksono, Besar et al., Detecting False Sharing in Open MP Applications Using the DARWIN Framework, Languages and Compilers for Parallel Computing, 2013, 15 pages.

Nanavati, Mihir et al., Whose Cache Line is it Anyway? Operating System Support for Live Detection and Repair of False Sharing, Department of Computer Science, University of British Columbia, Aug. 15-17, 2013, 14 pages.

* cited by examiner

| Cache No. | Loads | Stores | Address | PID | TID | InstAddress | Symbol | Object | CPU |
|---|---|---|---|---|---|---|---|---|---|
| 0 | 118789 | 273709 | 0x602380 | 37878 | | | | | |
| | 17734 | 136078 | 0x602380 | 37878 | 37878 | 0x401520 | lock_test | /root/mutex/a.out | 1{14}; |
| | 13452 | 137631 | 0x602380 | 37878 | 37883 | 0x4015a0 | lock_thread | /root/mutex/a.out | 1{16}; |
| | 15134 | | 0x6023b8 | 37878 | 37882 | 0x4011d7 | reader_thread | /root/mutex/a.out | 0{2}; |
| | 14684 | | 0x6023b8 | 37878 | 37880 | 0x4011d7 | reader_thread | /root/mutex/a.out | 0{0}; |
| | 13864 | | 0x6023b8 | 37878 | 37881 | 0x4011d7 | reader_thread | /root/mutex/a.out | 0{1}; |
| 1 | 31 | 69 | 0xffff0df40 | 37878 | | | | | |
| | 13 | 69 | 0xffff0df70 | 37878 | *** | 0xfff9f8e5 | update_cfs_rq | vmlinux | 0{0,1,2}; 1{14,16}; |
| | 17 | 0 | 0xffff0df60 | 37878 | *** | 0xfff9fc2e | upd_entity_load | vmlinux | 0{0,1,2}; 1{14,16}; |
| | 1 | 0 | 0xffff0df78 | 37878 | 37882 | 0xfff9fc4e | upd_entity_load | vmlinux | 0{2}; |

IDENTIFYING PERFORMANCE LIMITING INTERNODE DATA SHARING ON NUMA PLATFORMS

TECHNICAL FIELD

Examples of the present disclosure generally relate to non-uniform memory access (NUMA), and more specifically, relate to identifying performance limiting internode data sharing on NUMA platforms.

BACKGROUND

Non-Uniform Memory Access (NUMA) is a computer memory design where memory access time depends on the proximity of a processor to the memory that it accesses. A NUMA architecture usually includes several nodes that each have one or more processors, local memory on each node, and a local bus on each node connecting a node's processor(s) to its memory. A high speed communication network (e.g., QPI, HyperTransport™, etc.) interconnects each of the NUMA nodes.

Memory access time depends on whether a processor accesses memory on a local or remote node. Memory access time for remote memory usually takes longer than local memory because remote memory accesses travel across the communication network. Data sharing occurs in NUMA systems when a processor modifies an element of a cache line, causing other processors accessing the cache line to obtain an updated version of the cache line. False sharing generally occurs when unrelated data items on the same cache line are modified in close temporal proximity by multiple processors. In general, data sharing can result in significant performance degradation and false sharing is challenging to detect.

BRIEF DESCRIPTION OF THE DRAWINGS

The present disclosure is illustrated by way of example, and not by way of limitation, and can be understood more fully from the detailed description given below and from the accompanying drawings of various examples provided herein. In the drawings, like reference numbers may indicate identical or functionally similar elements. The drawing in which an element first appears is generally indicated by the left-most digit in the corresponding reference number.

DETAILED DESCRIPTION

Disclosed herein are systems, methods, and computer program products for identifying performance limiting internode data sharing on non-uniform memory access (NUMA) platforms.

In an example, memory accesses in a NUMA system are monitored and recorded by performance monitoring units (PMUs) as event records. The event records are associated with corresponding operating system information by an operating system profiler or other application to provide additional descriptive context. The event records are then analyzed to identify shared cache line utilization among the memory accesses. Event records participating in shared cache line utilization are further analyzed to identify patterns of data sharing, (e.g., true or false data sharing), and a shared cache line utilization report is generated.

Analyzing a focused set of event data collected by PMUs to perform shared cache line analysis is beneficial because an initial set of collected event records can be kept to a manageable number based on one or more event types of interest, the event records can be further narrowed by identifying which events participated in shared cache line utilization, and such analysis may be performed by monitoring system behavior without modifying application or system code.

Various illustrations of the present disclosure will be understood more fully from the detailed description given below and from the accompanying drawings of various examples described herein. In the drawings, like reference numbers may indicate identical or functionally similar elements. The drawing in which an element first appears is generally indicated by the left-most digit in the corresponding reference number.

Figure 1:
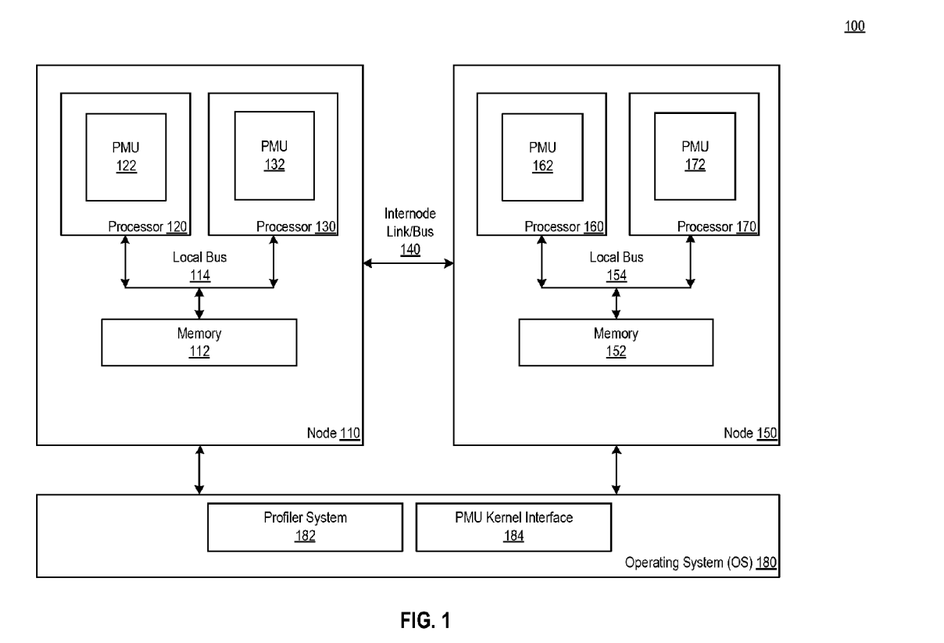
FIG. 1 is a block diagram illustrating an example of a computer system implementing a non-uniform memory access architecture (NUMA).

FIG. 1 is a block diagram illustrating an example of a computer system implementing a non-uniform memory access architecture (NUMA). Computer system 100 implements a NUMA architecture where some regions of memory are physically located on different buses than other regions of memory.

Computer system 100 includes an operating system 180 connected to multiple NUMA nodes 110, 150. NUMA nodes 110, 150 generally may be any computing device, such as a rackmount server, a workstation, a desktop computer, a notebook computer, a tablet computer, etc. Each NUMA node 110, 150 includes its own respective memory 112, 152 and processors 120, 130, 160, 170. Node 110 includes memory 112 coupled to processors 120, 130 via a local bus 114. Similarly, node 150 includes memory 152 coupled to processors 160, 170 via its own local bus 154. Memory 112 and memory 152 are visible to every NUMA node on computer system 100. However, access to memory on a remote node is generally slower and takes place over an internode link/bus 140.

The term "processor," generally refers to a single processor core. Each processor 120, 130, 160, 170 may be a processor core of a microprocessor, central processing unit (CPU), or the like. Some processors may be different processing cores of a processing device that consists of a single integrated circuit. Some processors may be components of a multi-chip module (e.g., in which separate microprocessor dies are included in a single package). Additionally, processors may have distinct dies and packaging, and be connected via circuitry such as discrete circuitry and/or a circuit board.

Each processor 120, 130, 160, 170 has its own respective performance monitoring unit (PMU) 122, 132, 162, 172. A PMU is generally hardware inside a processor (i.e., a CPU) used to gather statistics on the performance and behavior of the processor. For example, a PMU of a processor may export a set of programmable hardware counters that collect performance related data such as a number of instructions executed, a number of cache references, a number of cache misses, a number of branch instructions, a number of CPU cycles, etc.

Operating system (OS) 180 includes profiler system 182 and PMU kernel interface 184. Operating system (OS) 180 may be any OS, such as Linux®, Solaris®, Mac® OS, Windows®, etc. Profiler system 182 is an application, operating system tool or kernel module that provides monitoring, performance analysis and statistical profiling of computer system 100. In an example, profiler system 182 may be any tool that allows access to the PMU via the Linux operating system "perf events" subsystem. PMU kernel interface 184 is an operating system kernel interface that allows profiler system 182 to communicate with and to receive information, such as performance monitoring information, from PMUs 122, 132, 162, 172.

Computer systems using multiple threads (e.g., with multiple processors, multiple cores per processor, or both) introduce complexity into cache management. Different threads accessing the same data each may have their own private copy of the data in local cache. However, writes to the data by one thread should be visible to the other threads. The mechanism used to keep different caches synchronized is generally called a cache coherence protocol (e.g., MSI, MESI, MOSI, MOESI, MERSI, MESIF).

Data is generally transferred between memory and cache in fixed-size blocks called "cache lines." For example, a cache line may be 32, 64, or 128 bytes (or some other size). Many elements (e.g., variables) may be present in a single cache line at different locations (e.g., cache line offsets). Therefore, one or more threads may use a specific element in a cache line, while one or more different threads use other elements in the cache line. In general, when one thread updates an element of a cache line, the cache line is invalidated, requiring other threads to obtain the updated version of the cache line.

True sharing generally describes when a cache miss occurs because the same element in a cache line being accessed by one thread was updated by a different thread. On the other hand, false sharing generally describes when a cache miss results because one thread is accessing one part of a cache line, while another thread is updating a different element of the same cache line. False sharing usually creates performance issues and is challenging to detect. Automatically identifying such performance limiting internode data sharing can assist with its diagnosis and correction and result in significant performance improvement.

In this disclosure, the term "cache line" generally is used to describe a unit of memory for consistency. However, the scope of this disclosure is not limited to "cache lines" per se and also includes any measurable unit(s) of memory, such as blocks, pages, extents, segments, etc.

Figure 2:
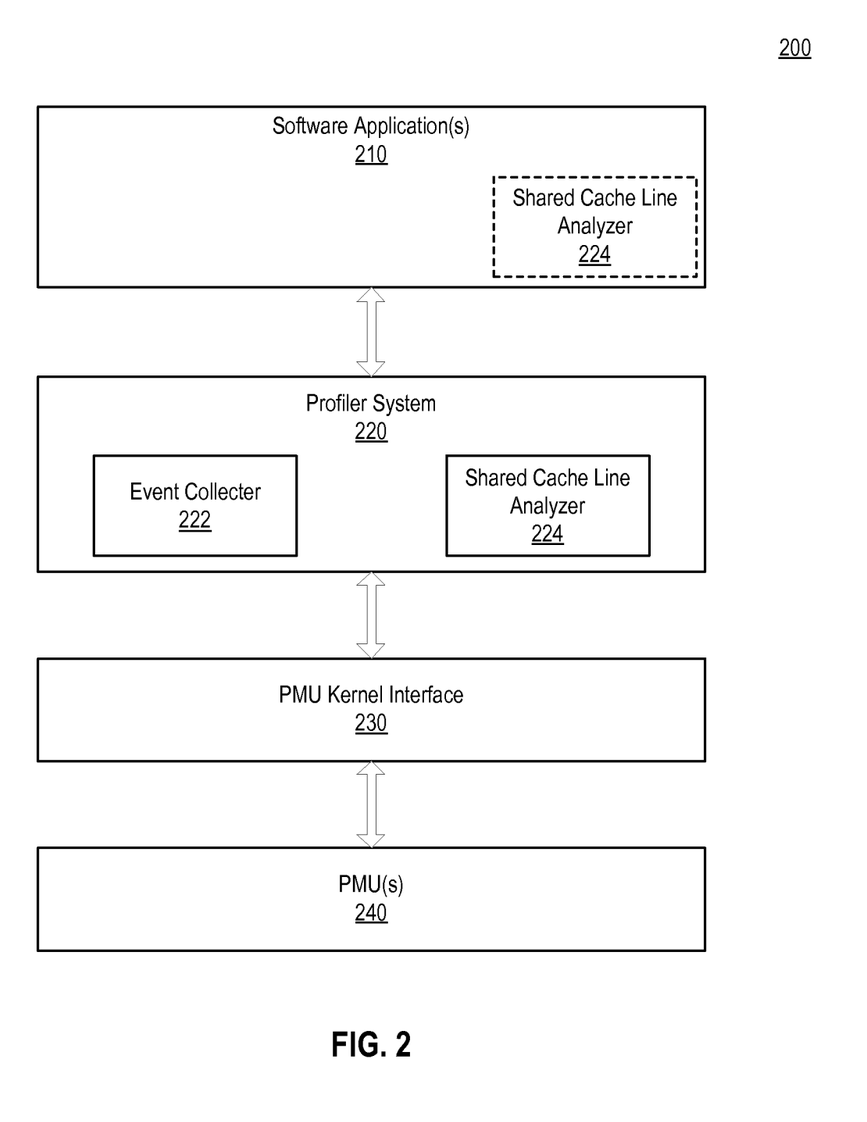
FIG. 2 is a block diagram illustrating an example of a system for providing identification of performance limiting internode data sharing on NUMA platforms.

FIG. 2 is a block diagram illustrating an example of a system for providing identification of performance limiting internode data sharing on NUMA platforms. System 200 may be part of a computing system such as a client computer (e.g., a personal computer, laptop, a PDA, a mobile phone, etc.), a server computer, or a gateway computer that includes physical memory and one or more processors (CPUs). System 200 may be part of one or more nodes of a NUMA computing system. System 200 also may be a part of a uniform memory access computing system that communicates with a NUMA computing system. Further, system 200 also may be distributed across two or more different computing systems. System 200 includes software application(s) 210, profiler system 220, PMU kernel interface 230 and PMU(s) 240.

Software application(s) 210 may represent one or more different applications of any type, including system processes, desktop applications, web applications, applications run in a web browser, etc. In an example, software application(s) 210 receive shared cache line utilization report information from profiler system 220. For example, software application(s) 210 may receive shared cache line utilization report information directly from profiler system 220 or by reading a shared cache line utilization report file generated by profiler system 220 on the same or on a different computing system.

In an example, software application(s) 210 receive event records and operating system information collected by profiler system 220 and generate a shared cache line utilization report. For example, software application(s) 210 may include a shared cache line analyzer 224 that analyzes event records and operating system information to identify shared cache line utilization and generate a shared cache line utilization report.

In an example, software application(s) 210 store the generated shared cache line utilization report in a file on a file server, in a database, in cloud storage, or in any data storage location. Software application(s) 210 also may transmit a shared cache line utilization report to one or more computing systems. In addition, software application(s) 210 may provide a generated shared cache line utilization report to a user for analysis by displaying the shared cache line utilization report data to the user in a graphical user interface (GUI).

Profiler system 220 may be an application, operating system tool or kernel module that provides performance analysis and statistical profiling of a computer system. In an example, profiler system 220 may be the "perf" performance analysis tool for the Linux® operating system. Profiler system 220 includes an event collector 222 and a shared cache line analyzer 224.

Event collector 222 is a module of profiler system 220 that receives records collected by performance monitoring units (PMUs) during event tracing. Event collector 222 also collects performance information available from an operating system and may associate or join event records with corresponding operating system information observed during event tracing. Event collector 222 also may store event records with the corresponding operating system information in a trace file for analysis.

Shared cache line analyzer 224 is a module of profiler system 220 that filters and analyzes event records with their corresponding operating system information to identify shared cache line utilization. For example, shared cache line analyzer 224 identifies and classifies data sharing for one or more cache lines by analyzing a collection of event records and corresponding operating system information. Shared cache line analyzer 224 also may provide a shared cache line utilization report that it generates, for example, by storing, transmitting, and/or displaying the report to a user in a graphical user interface.

PMU kernel interface 230 is an interface that allows a profiler system 220 to interact with performance monitoring units (PMUs 240) of processors in a computer system. For example, profiler system 220 may use PMU kernel interface 230 to send requests to PMUs 240. Profiler system 220 also may receive event data collected by PMUs 240 through PMU kernel interface 230. Thus, PMU kernel interface 230 generally provides access to PMU hardware in a processor from an operating system or an application running on the operating system.

A performance monitoring unit (e.g., PMUs 240) is generally hardware inside a processor (CPU) used to gather statistics on the performance and behavior of the processor. In an example, each processor of a computer system (e.g., computer system 100) may have a PMU that exports a set of programmable hardware counters that collect performance related data such as a number of instructions executed, a number of cache references, a number of cache misses, a number of branch instructions, a number of CPU cycles, etc.

The number and type of available hardware counters usually depends on the type of processor. In addition, while each processor may have its own corresponding PMU, a single PMU may be associated with one or more different processors. For example, a single PMU may be provided in a multi-core processor that comprises two or more independent processors that each read and execute program instructions.

Figure 3:
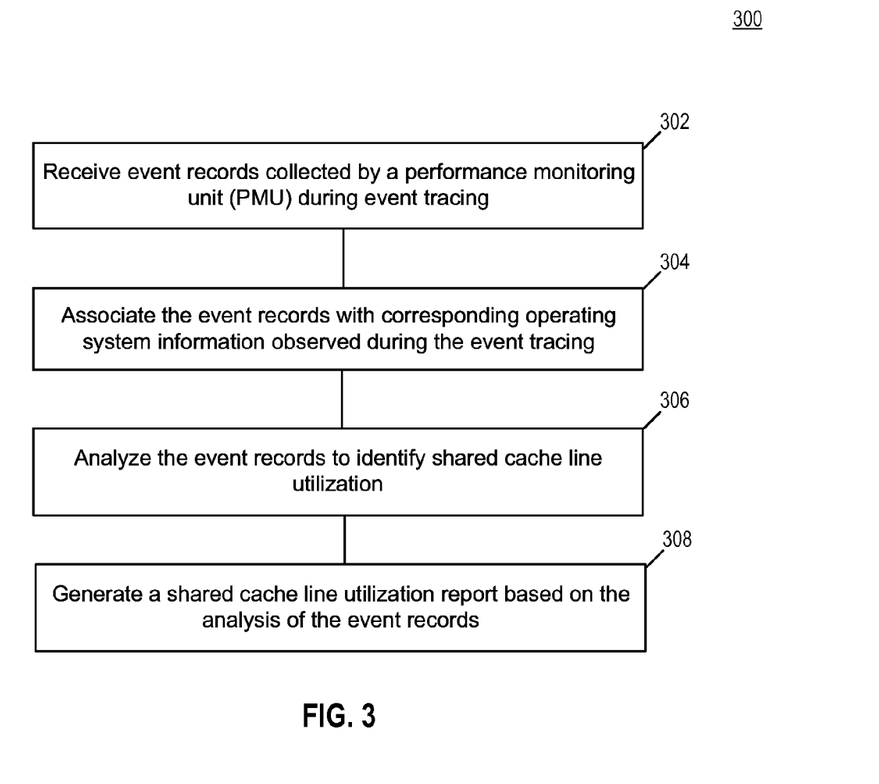
FIG. 3 is a flow diagram illustrating an example of a method for using performance monitoring unit (PMU) event data to identify internode data sharing on NUMA platforms.

FIG. 3 is a flow diagram illustrating an example of a method for using PMU event data to identify internode data sharing on NUMA platforms. The method 300 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 300 is performed by profiler system 220 of FIG. 2.

Method 300 begins at block 302 when a processor receives event records collected by a performance monitoring unit (PMU) during event tracing. In an example, an event collector 222 of a profiler system 220 receives event records from one or more PMUs 240 on a computer system during event tracing. In one example, event collector 222 receives the event records from the PMUs 240 via PMU kernel interface 230.

In an example, profiler system 220 sends one or more commands to the PMUs 240 via PMU kernel interface 230 to initiate event tracing. Profiler system 220 may indicate one or more different types of events for the PMUs 240 to monitor during the event tracing. In one example, profiler system 220 requests that PMUs 240 monitor memory load events and memory store events for each corresponding single-core or multi-core processor. Profiler system 220 may request monitoring of a subset of events to generate a focused set of performance related data for a particular purpose. For example, profiler system 220 may request the collection of memory load events and memory store events to perform shared cache line analysis.

In an example, profiler system 220 also instructs PMUs 240 to collect a sampling of observed events that match one or more event types. For example, profiler system 220 may indicate a sample rate to indicate how each PMU is to perform sampling. For example, a sample rate of "5" may indicate that each of the PMUs 240 is to collect every $5^{th}$ occurrence of an observed event type (e.g., memory load event). In one example, PMUs 240 perform event sampling using precise event based sampling (PEBS) counters available on Intel® processors (i.e., x86 processors).

In an example, a sample rate may be used for each event type to be collected by PMUs 240. For example, memory load events and memory store events each may have their own sample rates, and thus may be collected at the same frequency or at different frequencies. In one example, multiple events may be sampled together. For example, every $n^{th}$ occurrence of an observed memory load event or a memory store event may be collected by each of the PMUs 240.

Block 302 may be performed, for example, by event collector 222.

At block 304, the processor associates the event records with corresponding operating system information observed during the event tracing. In an example, each event record provided by a PMU includes the type of event observed (e.g., a memory load event), a memory address used during the observed event and other information. Some event records also may include a coherence response (e.g., a subtype or other attribute). In addition, profiler system 220 collects operating system information that may include a process ID (PID), a thread ID (TID), an originating CPU and node associated with each event record.

In an example, event collector 222 associates event records with corresponding operating system information observed during event tracing. For example, an event record may be joined with information such as its process ID (PID), a thread ID (TID), CPU and node. In an example, of event collector 222 supplements event records with corresponding operating system information to perform shared cache line analysis. In one example, event collector 222 stores the event records with their corresponding operating system information in a file, such as an event trace file, for analysis at a later time and/or on a different computing system.

Block 304 may be performed, for example, by event collector 222.

At block 306, the processor analyzes the event records to identify shared cache line utilization. In an example, a shared cache line analyzer 224 of a profiler system 220 (or software application 210) analyzes the event records to determine whether each event record is associated with a shared cache line. In one example, shared cache line analyzer 224 analyzes event records and corresponding operating system information stored in a file by event collector 222 at a previous time. In some examples, shared cache line analyzer 224 also may analyze such information in real-time by receiving the information directly from event collector 222 as it becomes available or shortly after becoming available.

In an example, shared cache line analyzer 224 examines each event record to determine whether the event record is associated with a shared cache line. In one example, shared cache line analyzer 224 analyzes a collection of memory load event records and memory store event records along with their corresponding operating system information.

In an example, shared cache line analyzer 224 examines an event record to determine whether the event record is a memory load event. When the event record is a memory load event, shared cache line analyzer 224 then examines the coherence response of the event record to determine whether the event record is associated with a remote hit of a modified cache line. When the coherence response indicates that the event record is associated with a remote hit of a modified cache line then shared cache line analyzer 224 counts the memory address of the cache line as shared and stores the memory load event record for reporting.

In an example, shared cache line analyzer 224 examines an event record to determine whether the event record is a memory store event. When the event record is a memory store event, shared cache line analyzer 224 determines whether the memory address of the cache line used by the store event was also used by a memory load event in the event records. When the memory address of cache line was also used by at least one memory load event then shared cache line analyzer 224 counts the memory store event as shared and stores the memory event record for reporting.

In an example, shared cache line analyzer 224 discards a memory store event record when the memory address of the cache line used by the store event was not used by a memory load event in one of the event records. In some examples, memory store event records may be prematurely discarded when shared cache line analyzer 224 has not yet processed a subsequent memory load event that accessed the same cache line (e.g., the memory load event occurs later in the event records).

In an example, shared cache line analyzer 224 maintains unmatched memory store event records having a cache line memory address that does not match memory addresses of processed memory load events. When initial processing of the event records is completed, shared cache line analyzer 224 reprocesses the unmatched memory store event records a second time to ensure that they were not associated with a previously unprocessed memory load event from the initial processing.

In an example, shared cache line analyzer 224 maintains a count of the number of times that a cache line has been shared. In one example, shared cache line analyzer 224 updates a shared cache line record to indicate a count representing the number of times shared cache line was accessed during the event tracing by memory load events. In one example, shared cache line analyzer 224 also updates a shared cache line record to indicate a count representing the number of times the shared cache line was accessed during event tracing by memory store events.

In an example, shared cache line analyzer 224 analyzes memory load event and memory store event records associated with a shared cache line to determine whether virtual/physical memory address mapping changes occurred during the period when the records were collected. In one example, shared cache line analyzer 224 discards event records that have experienced memory address remapping during event tracing to avoid the possibility of introducing spurious results from physical memory being reallocated across different nodes.

In an example, shared cache line analyzer 224 determines whether virtual/physical memory address mapping changes occurred by sorting or grouping stored memory load and store event records by process ID (PID) and virtual memory address. Shared cache line analyzer 224 then determines whether physical memory address changes for a given PID/virtual memory address pair have occurred. In one example, shared cache line analyzer 224 discards memory load and store event records associated with a PID that has experienced physical address changes to prevent spurious results.

Block 306 may be performed, for example, by shared cache line analyzer 224. to identify and classify data sharing on NUMA platforms.

At block 308, the processor generates a shared cache line utilization report based on the analysis of the event records. In an example, shared cache line analyzer 224 generates a shared cache line utilization report using memory load event and memory store event records that have not been discarded.

In an example, shared cache line analyzer 224 generates a shared cache line utilization report that includes a cache line access summary for each cache line. The cache line access summary includes the total number of local and remote load events for each cache line and the number of store events for each cache line.

In an example, the shared cache line utilization report generated by shared cache line analyzer 224 also includes a summary for each memory offset within a cache line where local and remote load events were observed. Depending on a coalescing option specified by a user, there may be multiple rows for a given offset to report a distinct instruction pointer, a distinct process ID (PID), a distinct thread ID (TID), median and/or mean load execution cycles, a coefficient of variation, a load execution cycle, and a participating CPU count. Additionally, the object and symbols related to the instruction pointer and process ID (PID) also may be displayed.

In an example, shared cache line analyzer 224 stores a generated shared cache line report. Shared cache line analyzer 224 also may transmit the generated shared cache line report to one or more other computer systems. In an example, a shared cache line analyzer 224 of a profiler system 220 or a software application 210 displays a generated shared cache line report to a user visually, for example, in a graphical user interface (GUI).

Block 308 may be performed, for example, by shared cache line analyzer 224.

Figure 4:
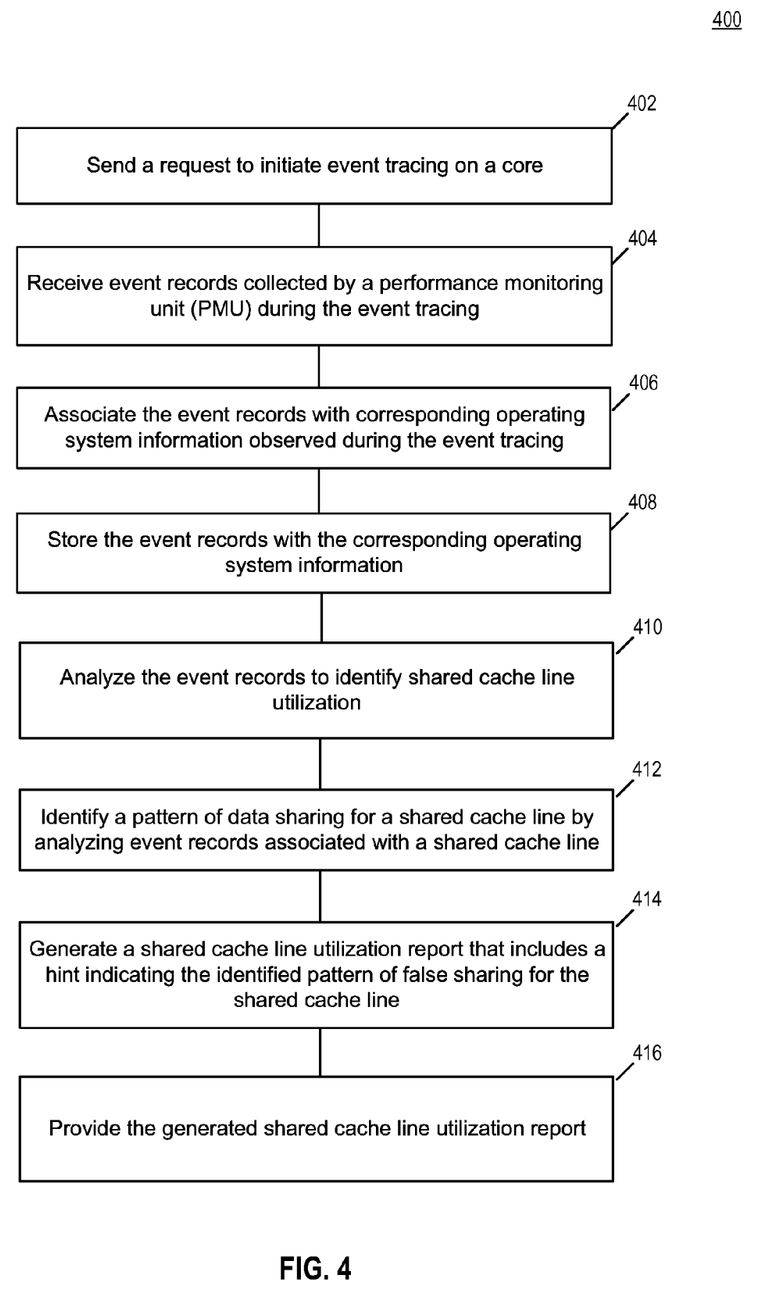
FIG. 4 is a flow diagram illustrating an example of a method for using PMU event data to identify and classify data sharing on NUMA platforms.

FIG. 4 is a flow diagram illustrating an example of a method for using PMU event data to identify and classify data sharing on NUMA platforms. The method 400 may be performed by processing logic that may comprise hardware (circuitry, dedicated logic, programmable logic, microcode, etc.), software (such as instructions run on a general purpose computer system, dedicated machine, or processing device), firmware, or a combination thereof. In one example, the method 400 is performed by profiler system 220 of FIG. 2.

Method 400 begins at block 402 when a processor sends a request to initiate event tracing on a core. In an example, profiler system 220 sends one or more requests to PMUs 240 to initiate event tracing. For example, profiler system 220 may send the requests to the PMUs 240 via PMU kernel interface 230. The requests may indicate one or more different event types to be monitored by the PMUs 240 during a period of event tracing. In addition, the request may be initiated, for example, a local or remote application or command line interface.

In an example, profiler system 220 requests that PMUs 240 gather memory load events and memory store events to collect data for shared cache line utilization analysis. Profiler system 220 also instructs PMUs 240 to collect a sampling of the memory load and memory store events. In one example, profiler system 220 provides a sample rate to each PMU within a coherent domain. The sample rate generally indicates how frequently a PMU should collect an observed event. For example, a sample rate of "8" may indicate that a PMU is to collect every $8^{th}$ occurrence of an observed event type (e.g., memory load event) or a collection of observed event types (e.g., observed memory load events and memory store events). In one example, PMUs 240 perform event sampling using precise event based sampling (PEBS) counters provided on Intel® processors (i.e., x86 processors).

Block 402 may be performed, for example, by profiler system 220.

At block 404, the processor receives event records collected by a performance monitoring unit (PMU) during the event tracing. In an example, an event collector 222 receives event records from one or more PMUs 240 on a computer system during event tracing. For example, event collector 222 may receive event records from the PMUs 240 via PMU kernel interface 230 in response to a request to initiate event tracing, such as in block 402.

Block 404 may be performed, for example, by event collector 222.

At block 406, the processor associates the event records with corresponding operating system information observed during the event tracing. In an example, event collector 222 associates event records with corresponding operating system information observed during event tracing. For example, an event record may be joined with information such as a process ID (PID), a thread ID (TID), a CPU and a node. In an example, event collector 222 supplements event records with corresponding operating system information to allow shared cache line analysis to be performed.

Block 406 may be performed, for example, by event collector 222.

At block 408, the processor stores the event records with the corresponding operating system information. In an example, event collector 222 stores the event records with associated operating system information in a file, such as an event trace file, for later analysis or so analysis may be performed on a different computing system. Event collector 222 may store the event records with associated operating system information on a file server, in a database, in cloud storage, or in any data storage location or device.

Block 408 may be performed, for example, by event collector 222.

At block 410, the processor analyzes the event records to identify shared cache line utilization. In an example, shared cache line analyzer 224 examines a collection of event records to determine whether each event record is associated with a cache line that was shared during the event tracing. In one example, the collection of event records includes memory load event records and memory store event records along with corresponding operating system information collected during the event tracing.

In an example, shared cache line analyzer 224 examines an event record to determine whether the event record is a memory load event. Shared cache line analyzer 224 examines the coherence response of each memory load event record to determine whether the event record is associated with a remote hit of a modified cache line (e.g., that another process somewhere else in the system had a valid copy of the cache link in a modified state). Shared cache line analyzer 224 then stores memory load event records associated with a remote hit of a modified cache line for shared cache line utilization reporting.

In an example, shared cache line analyzer 224 examines an event record to determine when the event occurred is a memory store event. Shared cache line analyzer 224 then determines whether the memory address of the cache line used by each store event was also used by at least one memory load event in the collection of event records. When a memory address of cache line was also used by a memory load event then shared cache line analyzer 224 stores the memory event record for shared cache line utilization reporting.

In an example, shared cache line analyzer 224 discards a memory store event record when the cache line used by the store event was not used by at least one memory load event in the event records. In one example, shared cache line analyzer 224 reprocesses unmatched memory store event records a second time after the initial processing of the event records is completed to ensure that unmatched memory store event records were not associated with a previously unprocessed (e.g., later occurring) memory load event in the collection of event records.

In an example, shared cache line analyzer 224 maintains a count of a number of times that a cache line has been shared. In one example, shared cache line analyzer 224 updates a shared cache line record to indicate a count representing a number of times the shared cache line was accessed during the event tracing by memory load events. In one example, shared cache line analyzer updates a shared cache line record to indicate a count representing a number of times the shared cache line was accessed during the event tracing by memory store events. In an example, shared cache line analyzer 224 maintains one or more counts for memory load event accesses, memory load events associated with a remote hit of modified cache, and memory store event accesses for each shared cache line.

In an example, shared cache line analyzer 224 analyzes memory load event and memory store event records associated with a shared cache line to determine whether virtual/physical memory address mapping changes occurred during the period when the records were collected. In one example, shared cache line analyzer 224 discards event records that have experienced memory address remapping during event tracing to avoid introducing inconsistency from physical memory being reallocated across different nodes.

In an example, shared cache line analyzer 224 determines whether virtual/physical memory address remapping occurred by detecting physical memory address changes for a given process ID/virtual memory address pair. In one example, shared cache line analyzer 224 discards stored memory load and store event records associated with a process ID that has experienced virtual/physical memory address remapping to prevent spurious results.

Block 410 may be performed, for example, by shared cache line analyzer 224.

At block 412, the processor identifies a pattern of data sharing for a shared cache line by analyzing event records associated with a shared cache line. In an example, shared cache line analyzer 224 identifies patterns of loads and stores to disjoint cache line offsets for a shared cache line. For example, shared cache line analyzer 224 may analyze how portions of a shared cache line were utilized during event tracing. In general, a cache line describes a unit of data retrieved from memory, and an offset is generally used to describe a particular location or area within a cache line.

In an example, shared cache line analyzer 224 uses cache line offsets to identify a patterns of true and false sharing for shared cache lines. In general, true data sharing is generally represented by a large percentage of memory load events and memory store events occurring at the same offsets while other offsets of the cache line have minimal or no utilization. However, offsets having a high number of memory store events compared to memory load events generally indicate the possible existence of false sharing. In one example, shared cache line analyzer 224 analyzes a shared cache line to detect a pattern of data sharing when a minimum number of memory load events and/or memory store events have been performed on a shared cache line or an offset in the shared cache line.

In an example, shared cache line analyzer 224 detects a pattern of false sharing for a shared cache line by comparing a number of memory load events occurring at an offset to a number of memory store events occurring at the offset. In one example, shared cache line analyzer 224 determines a ratio of memory load events to memory store events for an offset of a shared cache line. When the ratio of memory load events to memory store events for the shared cache line offset exceeds a predetermined threshold, then shared cache line analyzer 224 determines that a pattern of false sharing has been detected for the cache line.

Block 412 may be performed, for example, by shared cache line analyzer 224

At block 414, the processor generates a shared cache line utilization report that includes a hint indicating an identified pattern of false sharing for the shared cache line. In an example, shared cache line analyzer 224 generates a shared cache line utilization report using memory load event and memory store event records have not been discarded and provides hints (e.g., visual cue(s), indicator(s) and/or description(s)) highlighting one or more detected patterns of false sharing for the cache line.

In an example, shared cache line analyzer 224 generates a shared cache line utilization report that includes a cache line access summary for each cache line. The cache line access summary includes the total number of local and remote load events for a cache line and the number of store events for a cache line. In one example, a hint indicating an detected pattern of false sharing for a shared cache line may be included on a summary reporting line for the shared cache line or on a summary reporting line of an offset of the shared cache line.

Block 414 may be performed, for example, by shared cache line analyzer 224.

At block 416, the generated shared cache line utilization report is provided. In an example, shared cache line analyzer 224 provides a generated shared cache line utilization report by displaying report data to the user interface. Shared cache line analyzer 224 also may store and/or transmit a generated shared cache line utilization report. In an example, shared cache line analyzer 224 provides a shared cache line utilization report in a graphical user interface that groups data, such as process IDs, thread IDs, cache lines, etc. to allow users to drill up and down when analyzing the data.

Block 416 may be performed, for example, by shared cache line analyzer 224.

Figure 5:
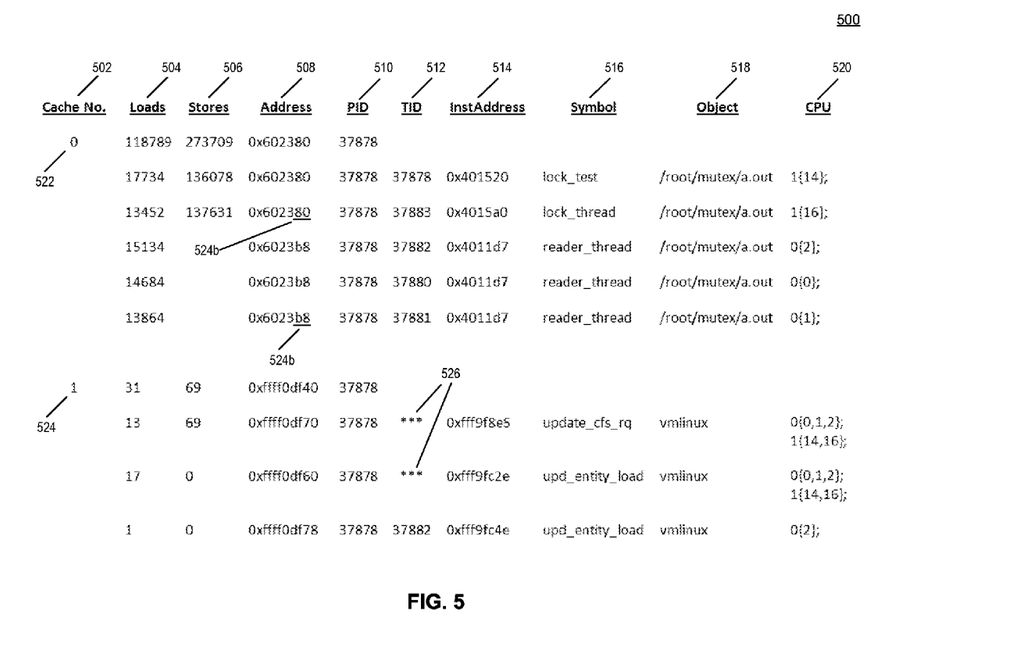
FIG. 5 is a diagram illustrating an example output from a shared cache line utilization report.

FIG. 5 is a diagram illustrating example output from a shared cache line utilization report. Example shared cache line utilization output 500 includes fields: cache identifier ("cache no.") 502, loads 504, stores 506, data address ("address") 508, process ID ("PID") 510, thread ID ("TID"), instruction address ("InstAddress") 514, symbol 516, object 518, and CPU 520. In one example, shared cache line utilization output 500 is sorted in descending order by cache lines having the most associated memory load events (i.e., loads 504).

Cache no. 502 is a cache line identification value. In an example, cache no. 502 is a generated unique sequential identifier. Cache no. 502 also may be a system provided or system derived value assigned to a cache line. Shared cache line utilization output 500 provides information about two shared cache lines. Cache no. "0" 522 begins at memory address "0x602380." Cache no. "1" 524 begins at memory address "0xffff0df40."

Loads 504 represents a count of observed memory load events where corresponding data was in a modified state in a remote cache. Stores 506 represents a count of observed memory store events. Data address ("address") 508 is a memory address associated with a shared cache line. Shared cache line offsets (e.g., offsets 524a, 524b) each represent a particular memory address location on a shared cache line.

Process ID ("PID") 510 represents process identifiers that contributed to the associated memory load events and memory store events. Similarly, thread ID ("TID") 512 represents thread identifiers that contributed to the associated memory load events and memory store events. Multiple PIDs and/or TIDs may be grouped or coalesced (e.g., indicator "***" 526) to indicate that multiple PIDs and/or TIDs contributed to the associated memory load events and memory store events. One or more other fields may be coalesced, for example, by default or based on user preference(s) and/or one or more report generation parameters provided by a user.

Instruction address ("InstAddress") 514 represents the address of an executed instruction that contributed to the associated memory load events and memory store events. Symbol 516 represents the name of the function responsible for causing the memory accesses to occur. Object 518 represents the program or object that caused the memory accesses to occur. CPU 520 identifies nodes and CPUs that contributed to the memory load events and memory store events for a particular row. In an example, memory load event and memory store event counts may be provided for each node and/or each CPU on each node based on user preferences and/or one or more report generation parameters provided by a user.

Figure 6:
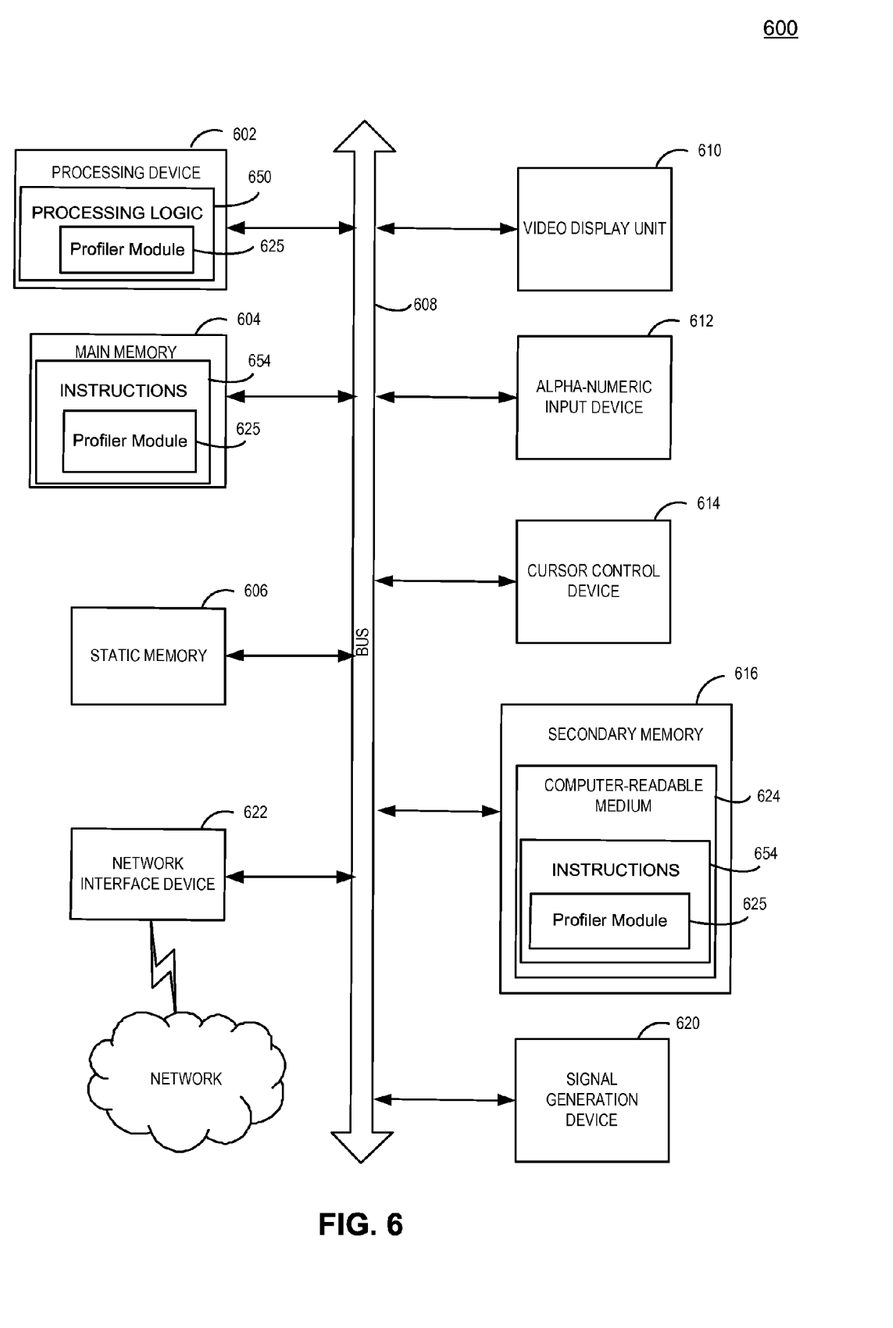
FIG. 6 illustrates a diagrammatic representation of a machine in the exemplary form of a computer system.

FIG. 6 illustrates a diagrammatic representation of a machine in the exemplary form of a computer system 600 within which a set of instructions, for causing the machine to perform any one or more of the methodologies discussed herein, may be executed. In some examples, the computer system 600 may correspond to a uniform memory access computer system that communicates with a non-uniform memory access (NUMA) computer system to identify performance limiting internode data sharing on the NUMA computer system. In some examples, the computer system 600 generally may correspond to a node of a NUMA computer system, such as computer system 100 of FIG. 1.

In examples of the present disclosure, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processing device 602, a main memory 604, which may be distributed over multiple nodes (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 616 (e.g., a data storage device), which communicate with each other via a bus 608.

The processing device 602 represents one or more general-purpose processing devices such as a microprocessor, central processing unit, or the like. The processing device may include multiple processors. The processing device 602 may include a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 402 may also be one or more special-purpose processing devices such as an application specific integrated circuit (ASIC), a field programmable gate array (FPGA), a digital signal processor (DSP), network processor, or the like.

The computer system 600 may further include a network interface device 622. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 620 (e.g., a speaker).

The secondary memory 616 may include a machine-readable storage medium (or more specifically a computer-readable storage medium) 624 on which is stored one or more sets of instructions 654 embodying any one or more of the methodologies or functions described herein (e.g., memory manager 625). The instructions 654 may also reside, completely or at least partially, within the main memory 604 and/or within the processing device 602 during execution thereof by the computer system 600 (where the main memory 604 and the processing device 602 constituting machine-readable storage media).

While the computer-readable storage medium 624 is shown as an example to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine that cause the machine to perform any one or more of the operations or methodologies of the present disclosure. The term "computer-readable storage medium" shall accordingly be taken to include, but not be limited to, solid-state memories, and optical and magnetic media.

The computer system 600 may additionally include a profiler module (not shown) for implementing the functionalities of profiler system 220. The modules, components and other features described herein (for example, in relation to FIG. 2) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices have been shown in block diagram form, rather than in detail, in order to avoid obscuring the present disclosure.

Some portions of the detailed description have been presented in terms of algorithms and symbolic representations of operations on data bits within a computer memory. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "up-dating", "determining", "storing", "computing", "comparing", "initializing", "returning", "providing," "mapping," "notifying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain examples of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other examples and implementations will be apparent to those of skill in the art upon reading and understanding the above description. The scope of the disclosure should therefore be determined with reference to the appended claims, along with the full scope of equivalents to which such claims are entitled.

What is claimed is:

1. A computer-implemented method, comprising:
   receiving, by a processor, event records collected by a performance monitoring unit (PMU) during event tracing;
   associating, by the processor, the event records with corresponding operating system information observed during the event tracing;
   analyzing, by the processor, the event records to identify shared cache line utilization;
   determining, by the processor based on the analyzing, whether a memory address of a cache line used by an event record was used by another event record that is a load event when the event record is a store event; and
   generating, by the processor, a shared cache line utilization report in view of the analyzing.

2. The method of claim 1, further comprising:
   sending, by the processor, a request to initiate the event tracing on a core.

3. The method of claim 2, wherein the request to initiate the event tracing indicates an event type for the PMU to monitor on the core during the event tracing.

4. The method of claim 3, wherein the event records collected by the PMU are sampled during the event tracing by the PMU for events of the event type.

5. The method of claim 1, further comprising:
   storing, by the processor, the event records with the corresponding operating system information.

6. The method of claim 1, wherein the receiving, the associating, the analyzing, and the generating are performed by a performance profiler of an operating system.

7. The method of claim 1, wherein the analyzing comprises:
   examining, by the processor, an event record to determine whether the event record is a load event.

8. The method of claim 7, wherein the analyzing further comprises:
   examining, by the processor, a coherence response of the event record when the event record is a load event to determine whether the event record is associated with a remote hit of a modified cache line.

9. The method of claim 1, wherein the analyzing comprises:
   examining, by the processor, an event record to determine whether the event record is a store event.

10. The method of claim 1, wherein the analyzing comprises:
    updating, by the processor, a shared cache line record to indicate a count representing a number of times the shared cache line was accessed during the event tracing by load events.

11. The method of claim 10, wherein the count includes load events for remote hits of a modified version of the shared cache line.

12. The method of claim 1, further comprising:
identifying, by the processor, a type of data sharing for a shared cache line by analyzing event records associated with the shared cache line.

13. The method of claim 1, further comprising:
providing, by the processor, a hint in the generated shared cache line utilization report indicating a detected pattern of false sharing for the shared cache line.

14. A non-transitory computer-readable medium having instructions recorded thereon, that when executed by a processor, cause the processor to perform operations, comprising:
receiving, by the processor, event records collected by a performance monitoring unit (PMU) during event tracing;
associating, by the processor, the event records with corresponding operating system information observed during the event tracing;
analyzing, by the processor, the event records to identify shared cache line utilization;
determining, by the processor based on the analyzing, whether a memory address of a cache line used by an event record was used by another event record that is a load event when the event record is a store event; and
generating, by the processor, a shared cache line utilization report in view of the analyzing.

15. The non-transitory computer-readable medium of claim 14, the operations further comprising:
sending, by the processor, a request to initiate the event tracing on a core.

16. The non-transitory computer-readable medium of claim 14, the operations further comprising:
displaying, by the processor, the generated shared cache line utilization report.

17. A system, comprising:
a memory;
a processor coupled to the memory, wherein the processor is to:
receive event records collected by a performance monitoring unit (PMU) during event tracing;
associate the event records with corresponding operating system information observed during the event tracing;
analyze the event records to identify shared cache line utilization;
determine, based on analyzing the event records, whether a memory address of a cache line used by an event record was used by another event record that is a load event when the event record is a store event; and
generate the shared cache line utilization report in view of the analyzing performed on the event records.

18. The system of claim 17, wherein the processor further is to:
send a request to initiate the event tracing on a core.

19. The system of claim 17, wherein the processor further is to:
store the generated shared cache line utilization report.

20. The system of claim 17, wherein the processor further is to:
display the generated shared cache line utilization report.

* * * * *